United States Patent
Le Pennec et al.

(10) Patent No.: US 7,320,143 B2
(45) Date of Patent: Jan. 15, 2008

(54) METHOD OF GAINING SECURE ACCESS TO INTRANET RESOURCES

(75) Inventors: Jean-François Le Pennec, Nice (FR); Aurélien Bruno, Nice (FR); Nicolas Grisi, La Colle sur Loup (FR); Jean-Marie Sommerlatt, Vence (FR)

(73) Assignee: AT&T Corp., New York, NY (US)

( * ) Notice: Subject to any disclaimer, the term of this patent is extended or adjusted under 35 U.S.C. 154(b) by 924 days.

(21) Appl. No.: 10/638,860

(22) Filed: Aug. 11, 2003

(65) Prior Publication Data

US 2004/0059909 A1    Mar. 25, 2004

(30) Foreign Application Priority Data

Sep. 24, 2002    (FR) .................................. 02 11755

(51) Int. Cl.
*G06F 17/30*    (2006.01)
*G06F 7/04*    (2006.01)
*G06K 9/00*    (2006.01)
*H03M 1/68*    (2006.01)
*H04L 9/00*    (2006.01)
*H04L 9/32*    (2006.01)
*H04K 1/00*    (2006.01)
*H04N 7/16*    (2006.01)

(52) U.S. Cl. .............................. 726/30; 726/12; 726/22; 726/26; 713/168; 713/170; 713/153; 709/229; 709/227; 709/225

(58) Field of Classification Search ................ 709/229, 709/227, 225; 713/168, 170, 153; 726/12, 726/22, 30, 26
See application file for complete search history.

(56) References Cited

U.S. PATENT DOCUMENTS 6,304,969 B1 * 10/2001 Wasserman et al. ........ 713/172
7,080,046 B1 *  7/2006 Rezvani et al. ............... 705/64
2002/0159444 A1 * 10/2002 Vialen et al. ................ 370/352

FOREIGN PATENT DOCUMENTS

WO    WO 01/63853   A1       8/2001
WO    WO 200163853 A1  *    8/2001
WO    WO 02/21415   A1       3/2002

OTHER PUBLICATIONS

Whalen, Sean, "An Introduction to Arp Spoofing", arpspoof@gmx.net, Apr. 2001, Revision 1; http://packetstormsecurity.nl/papers/protocols/intro_to_spoofing.pdf.
French Patent Office Search Report, from Counterpart French Patent Application No. 0211755.

* cited by examiner

*Primary Examiner*—Kambiz Zand
*Assistant Examiner*—Michael J Simitoski (57) ABSTRACT

Method of gaining secure access from a host (13) to Intranet resources provided by at least a content server (18) in a data transmission system wherein the host is connected to the content server through a gateway (17). Such a method consists in generating and sending at predetermined transmission instants from either the host or the gateway verification messages wherein each verification message contains a signature which depends upon the data exchanged between the host and the gateway since the preceding verification message, the host and the gateway also called peer devices having at their disposal a same algorithm defining which of them sends a verification message at each of the predetermined instants.

12 Claims, 5 Drawing Sheets

METHOD OF GAINING SECURE ACCESS TO INTRANET RESOURCES

TECHNICAL FIELD

The present invention relates generally to the secure access to Intranet resources without implementing direct end to end tunneling but in using an anti-spoofing technique between the host and the gateway linked to the resource servers and relates in particular to a method of gaining secure access to Intranet resources.

BACKGROUND

The Internet Protocol (IP) basically operates with small portions of data called packets containing a header that contains the destination address and the source address. The IP protocol being connectionless, the routers of the network route packets based on the destination address without considering the source address.

However, the handling of the source address by unauthorized people can create a problem which is known as "spoofing" which is the number one problem with Internet. Indeed, to gain access to some resources, intruders create packets with spoofed source IP addresses. Such packets can be routed through filtering firewalls if they are not configured to filter incoming packets whose the source address is in the local domain. It is important to note that this attack is possible even if no reply packets can reach the intruder. Configurations that are potentially vulnerable include routers to external networks that support multiple internal interfaces, routers with two interfaces that support subnetting on the internal network, proxy firewalls where the proxy applications use the source IP address for authentication, and routers or gateways accessing internet with tunneling to an internal network.

Network administrators have the option to use source address filtering on their routers with the aid of anti-spoofing filters. However, these filters have some limitations depending on the type of spoofing and network implementation.

One of the best known dangers of spoofing is the use of spoofing in combination with sniffing in order to perform an attack where the sniffed data are used to generate a response that is based on the spoofed address translation in order for the machine of the spoofer to make the target believe that it is the entity which is trying to contact.

An example of spoofing combined with sniffing is Domain Name Server (DNS) spoofing wherein a DNS server accepts and uses incorrect information from a host that has no authority to provide such giving this information. Such an attack may cause users to be directed to wrong Internet sites or e-mails being routed to non-authorized mail servers.

Another significant spoofing type is used with Address Recognition Protocol (ARP). In the ARP spoofing, hackers can discover active devices on a local network segment by sending a simple series of ARP broadcasts and incrementing the value of the target IP address field in each broadcast packet to find the hardware address of a destination. This spoofing method is similar to DNS spoofing, but applies only one layer and is used in lower layers in the TCP/IP stack, and may be used on switched networks as well. With this method, the attacker can convince any host or router that it is the host or router on the local network that it should forward its IP packets to the attacker. This method is now commonly used for sniffing switched networks. Before communicating with a host, an IP device must obtain the hardware address of the destination host or the next-hop router along the path to the host. ARP cache poisoning is one of the most efficient attacks in directly manipulating the cache of a target device in order to either add a new entry in the table or update an existing entry. This allows for different attacks such as the interception of all flows from one device to another device. This attack is more commonly known as the "man in the middle" attack.

Figure 1:
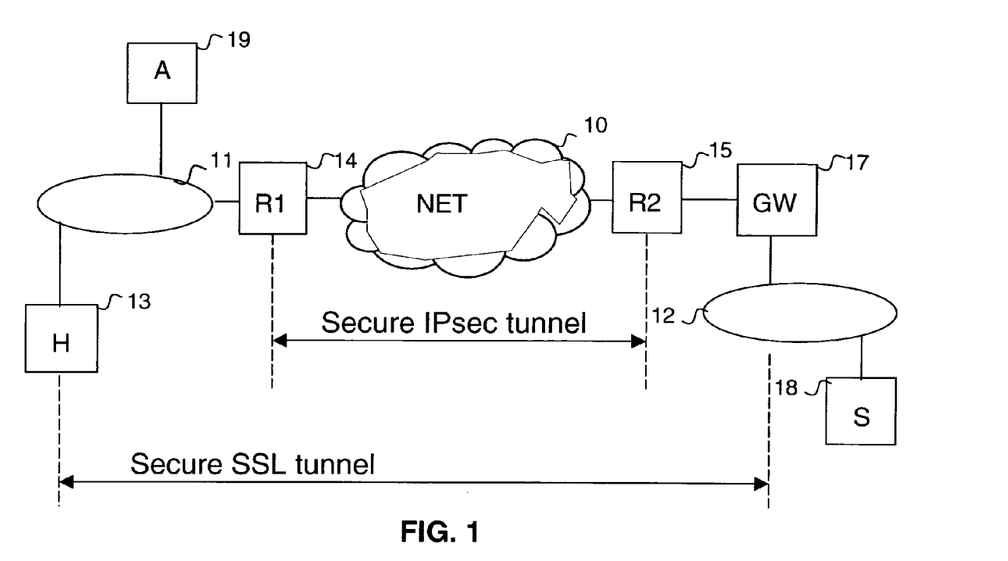
FIG. 1 is a block-diagram representing a data transmission system of the prior technique wherein a first secure solution is used.

There are several solutions enabling to protect a network against spoofing attacks. One of these solutions is illustrated in FIG. 1 which describes the environment from a host 13 to a server 18 through a secure tunnel. The secure tunnel uses the standard IPsec for tunneling and encryption over an unsecured network NET 10 between two peer routers R1 14 and R2 15. Host 13 can reach the router 14 via LAN 11. The content servers such as server 18 are reached through another LAN 12. Authentication is performed through a portal or a gateway GW 17. When authentication is performed, the gateway provides access to server S 18. It must be noted that network 10 can be either the Internet or an Intranet network.

In the environment illustrated in FIG. 1 sharing the same IPsec tunnel, there is a need for user authentication. Many solutions exist for this authentication, but none that can simply verify that no host IP address spoofing is performed during the connection. The technique based upon Secure Socket Layer (SSL) provides this authentication and some anti-spoofing mechanisms thanks to the keys being used.

SSL is the standard method sharing secret by using public and private keys. Since the host and the gateway are using the same secret key for encrypting and decrypting their information, they can have a certain comfort in knowing this information cannot be intercepted and decoded by a third party. But this depends on whether the encryption is strong or weak and the protection provided by SSL is not sufficient for preventing some attacks.

Furthermore, such a secure solution like SSL has performance drawbacks and security limitations as well as being designed primarily for web server access. SSL includes encryption whereas the remote access generally provides also encryption thanks to IPsec. The SSL encryption cannot be removed. Moreover, SSL includes also the encapsulation which is therefore done twice if there is an IPsec tunnel. So, using this existing mechanism does not help to reduce the overhead and the encryption processing of the system.

Figure 2:
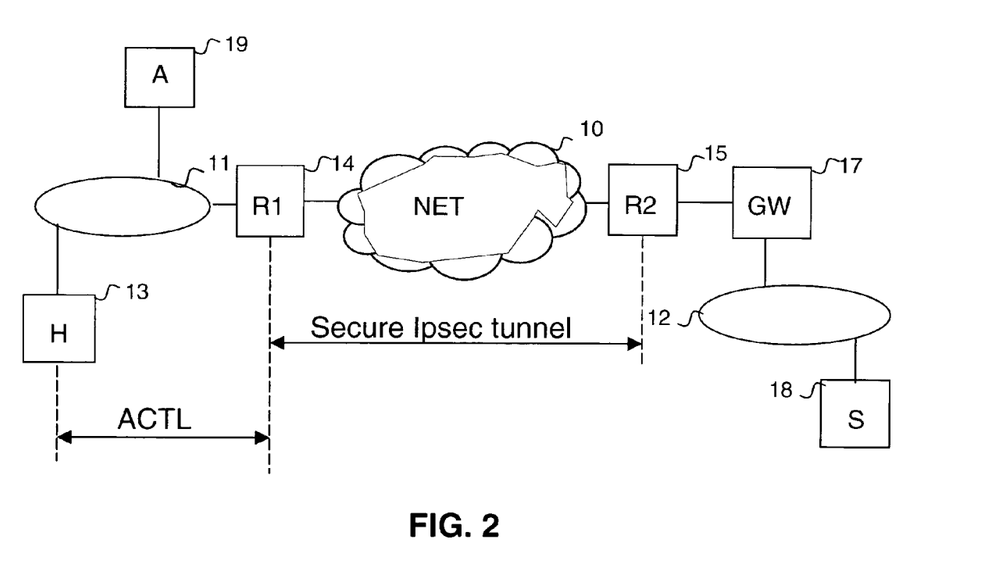
FIG. 2 is a block-diagram representing the same data transmission system of the prior technique wherein a second secure solution is used.

FIG. 2 describes an alternate solution applied to the same network system as the one illustrated in FIG. 1. Such a solution, using standard protocols such as IPsec AH or 802.1x as an access control method (ACTL) between host 13 and router 14, offers the host authentication but not the user authentication. Since hacking a PC password is easy, this solution is not very secure since no user authentication is performed. Both mechanisms need router capability to do that, which means that the same administrative entity should have administrative control over the router and the hosts and activate function. Therefore, such an alternative is complex to implement and provides insufficient security.

SUMMARY OF THE INVENTION

Accordingly, the main object of the invention is to achieve a method of gaining secure access to Intranet resources which enables to prevent a connection between a host and at least a content server through a gateway from being spoofed and which does not require implementing complex mechanisms impacting the performance of the system.

Therefore, the invention relates to a method of gaining secure access from a host to Intranet resources provided by at least a content server in a data transmission system wherein the host is connected to the content server through a gateway; Such a method consists in generating and sending at predetermined transmission instants from either the host or the gateway verification messages wherein each verification message contains a signature which depends upon the data exchanged between the host and the gateway since the preceding verification message, the host and the gateway also called peer devices having at their disposal a same algorithm defining which of them sends a verification message at each of the predetermined instants.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

As it has been mentioned in the description of FIG. 1 and FIG. 2 representing a data transmission system including a secure tunnel, the prior methods such as SSL or IPsec AH are not suitable insofar as either they require that the data be encrypted and encapsulated resulting in increasing the overhead or they do not provide a user authentication but only a host authentication.

In the method according to the invention, the above problems are solved by implementing two joined mechanisms. The first mechanism is a permanent verification of the presence of the valid peer (host or gateway) as being the source of data and the second one is the local verification that no spoofing is performed. Each time a new flow starts from the host, the verification that the right user on the host uses the source address is performed. Then, the gateway and the host perform independently this verification during the session. Thus, neither complex tunneling nor encapsulation is required as in the prior systems.

Figure 3:
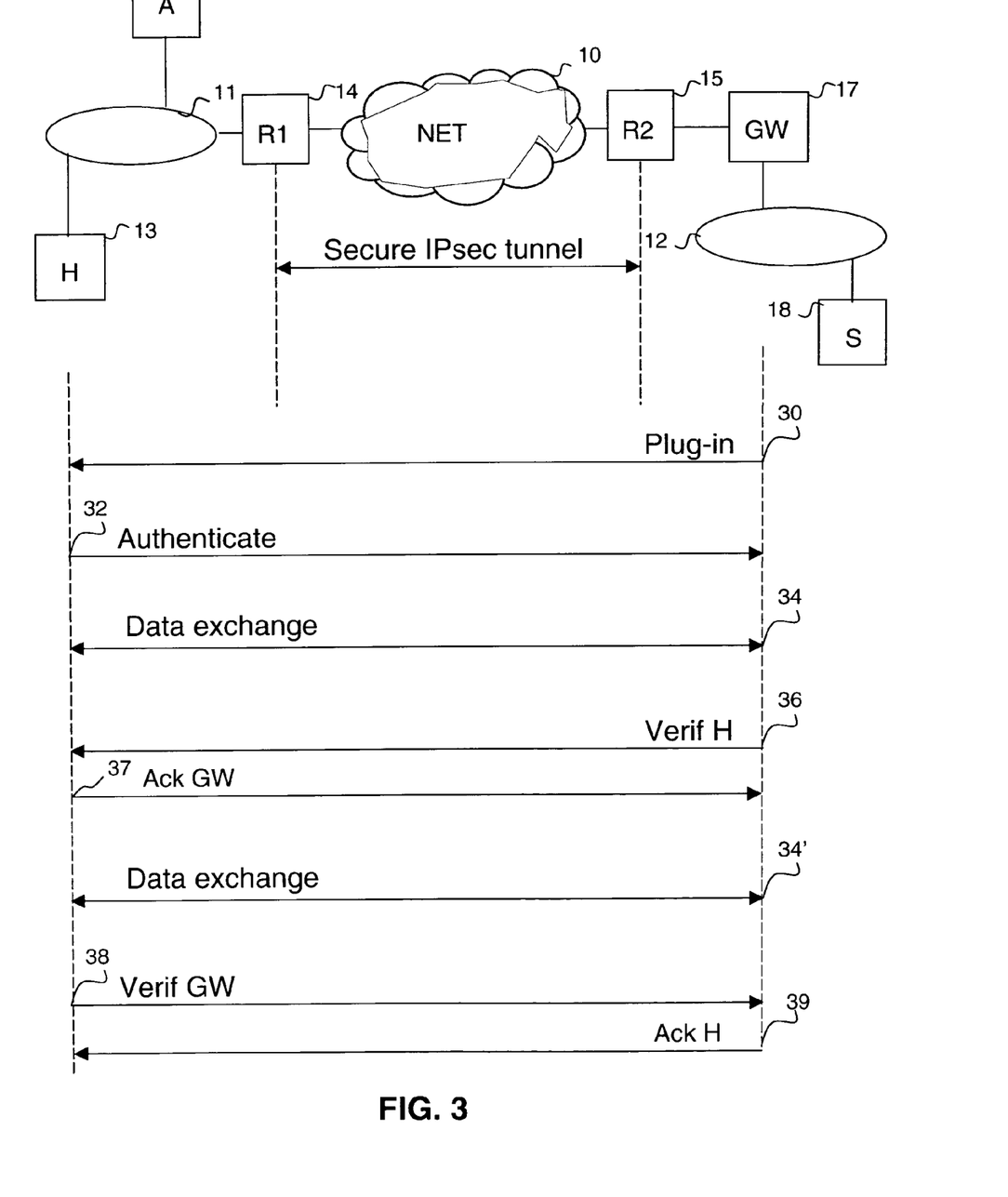
FIG. 3 is a block-diagram representing the same data transmission system as in FIG. 1 wherein the method according to the invention is implemented.

In reference to FIG. 3 wherein the data transmission system is the same as the one illustrated in FIG. 1 and FIG. 2, the gateway 17 first downloads the plug-in on a first step 30 or just configures it if already installed in the host. This plug-in contains a public key and a shared secret key. This shared secret key encrypted by the public key may be transmitted to the Host. Then, an authentication phase 32 is performed. The user on host 13 authenticates by providing his identification ID and his password encrypted by the public key. Then, reversely, the gateway authenticates the user of host 13. Note that the host 13 can use the plug-in and a local application to verify that its IP address and the associated MAC address on the LAN is unique, meaning that nobody is spoofing one of these addresses.

In order to protect data flows from being spoofed, a new type of sequence numbering is started, based on ID/password and/or shared secret key, which is calculated independently on both peer devices, Host and Gateway, because each of them knows all parameters to build it. This sequence numbering evolves based on a defined algorithm so that nobody else can generate the right next sequence number. This pseudo-random sequence number is used to transport all IP traffic that uses a sequence number. Otherwise, other IP fields or upper layer fields may be used for this purpose. For protocols using a non incremental sequence number, a scrambler can be used to swap the field at transmission using the shared secret between H and GW and swap back to the initial value at the other end. This is the way the data exchange 34 or 34' can be performed.

This sequence number renumbering is optional on data packets. The option may include a more protective feature that calculates new sequence numbers not only based on original numbers and a secret value but also based on the CRC or hashing of the packet itself. This latter option limite the risk for packet modification without overhead impact.

The connection process is permanently managed by a secure verification of the flow integrity that is performed thanks to messages Verif H 36 and Verif GW 38. This message for verifying the peer identity (H 13 or GW 17) is sent at predetermined instants provided by timers and defined by several parameters including an average time and the shared secret key in order to prevent another device to generate such messages. These messages can include information about the traffic exchanged between the two peer devices such as a signature of the traffic: number of packets, number of bytes or a more complex signature. When the host 13 receives a verification message 36 from the gateway 17, it sends back an Ack GW 37 to the gateway. Likewise, when the gateway 17 receives a verification message 38 from the host 13, it sends back an Ack H 39 to the host.

The verification message forwarded from the host or the gateway is based on these timers and the opposite side should answer within a short delay with the right answer. If there is no answer or a bad answer, the connection is stopped. If no data is received or bad data received, then the session is stopped. In addition, these messages are encrypted and signed. Between two verification messages, the data traffic is sent transparently with the sequence number change option. Note that, if no acknowledgement message is received by either the host or the gateway in response to a verification message, the connection is also stopped.

A more secure option is to pass as an argument within a message the cumulative hashing value of all packets between two messages to avoid "man in the middle" attack. The list of sequence number used since the last verification message can be also transmitted in the message payload to improve the verification of packets received. This is valid if the data packets are protected by the proposed sequencing mechanism, or even when using the original sequence numbers. It also helps to identify which packets are to be considered between two verification messages in order to solve packet synchronization problem.

Figure 4A:
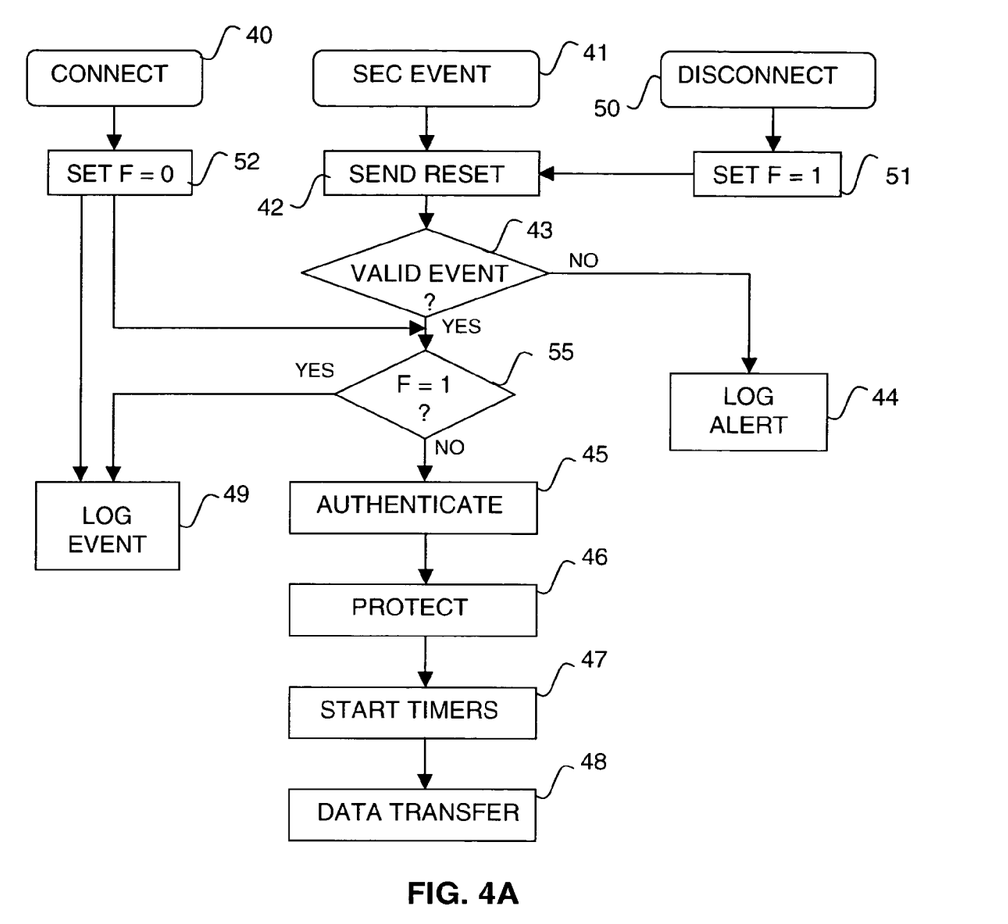
FIG. 4A is a flow chart representing the actions which are implemented either in the host or the gateway upon the occurrence of different events.

Referring to FIG. 4A which describes the process steps achieved in each one of the peer devices, host or gateway, the process starts on step CONNECT 40 where the secure connection is started meaning that a connect message is sent to the session peer to start the same process in parallel. It is the step where the plug-in is downloaded if necessary and corresponds to step 30 of FIG. 3. A FLAG F is set to a zero value on next step 52 in order to identify that a connection has been started. In addition, an event is stored with a timestamp to keep the starting session event thanks to LOG EVENT STEP 49.

Then, on next step 55, as F value is zero, the process continues on step 45. The authentication is performed on this step 45 called AUTHENTICATE as described in previous FIG. 3. The next step PROTECT 46 starts the local protection mode for anti-spoofing. The functions involved will be described later in the document but, basically, the detection of a potential spoofing will result in activating the process starting on step SEC EVENT 41 for analyzing this security event.

At this point, based on the shared secret key as already mentioned, pseudo-random timers using scramblers are started. This is the step START TIMERS 47 which allows entering in DATA TRANSFER mode 48.

Another input into this process, which starts on step SEC EVENT 41, ensures that the connection will be aborted in case of local spoofing. Step SEND RESET 42 follows immediately this detection and sends a reset message to the peer device (GW or H) to abort the current transmission. This is when the secure event cannot be certified automatically as a normal change.

It is then determined whether the event is validated in step VALID EVENT 43 allowing either to restart the secure connection on step 45 or to log an alert LOG ALERT 44. This validation for security event process can either be a local validation with a POP UP window on the user screen on Host H with some explanation or a validation request forwarded to a network administrator. This manual validation of the event can be pre-analyzed by an expert system which will either take the decision or make recommendation. Such a validation is induced by a change of address (MAC or IP) in a networking device such as Gateway GW 17, router R1 14 or R2 16. A change of an existing Host IP or MAC address will never be granted and will bypass the validation step to log an alert directly with a POP UP message anyway. A new Host connected to LAN 11 will be also detected but if the MAC address is a MAC address that has already been used in the past and which can be verified by either the local host which stores previous approved ARP tables or by the administrator which can make a lookup in a MAC address directory database, then the expert system can grant this ARP table new input and let the corresponding cache being updated. In such a case, a verification that the associated IP address for this new host is either the previous IP address or an address kept into a valid DHCP range for this LAN or a static address that has been assigned by the administrator to this Host is performed. If this validation is satisfactorily completed, the event is considered as valid.

When the event is not validated, Whatever the validation method used, the process jumps to step LOG ALERT 44 where an alert is stored locally on Host H and sent to the administrator. Additionally, a message may be sent to the new host that raises this event in order to advise it to contact the administrator for getting LAN access approval.

When the event is validated, a verification of the value of flag F is done on step 55 to verify if a reconnection should be performed in order to continue to exchange data via Gateway GW: This corresponds to value 0 for Flag F. A 1 value at this stage for Flag F means that a disconnection has been done and no reconnect is required. In this case the session process logs an event with a timestamp on step LOG EVENT 49.

The remaining input to this session process is the disconnect function which starts on step DISCONNECT 50 either by manual user request or by logoff of this user or by shutdown of Host H. The Flag F is set to value 1 to reflect this change on step 51 and the process sends a reset to the secure session peer on step 42. Normally, the session is stopped by host H, but a shutdown or reboot of gateway GW for maintenance purpose may also abort all secure sessions.

Figure 4B:
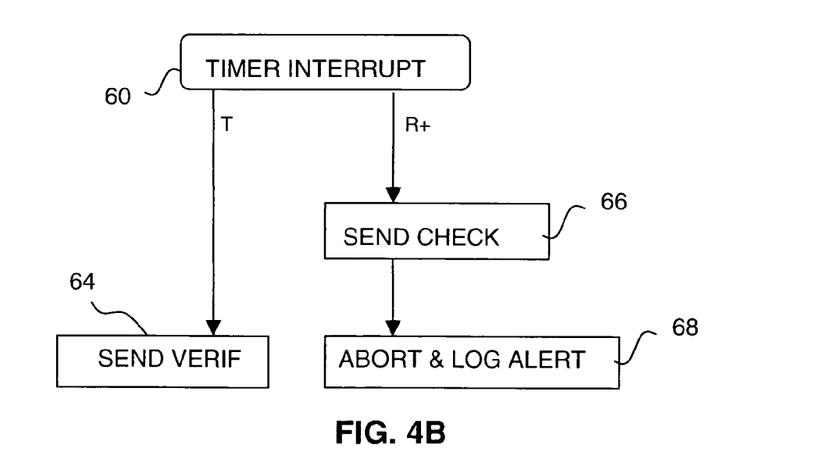
FIG. 4B is a flow chart representing the action undertaken in either the host or in the gateway upon timer interrupts.

FIG. 4B shows the timer interrupt process. Two timers have been started on step 47. A first timer called transmission timer T is the one used to generate and transmit verification messages. A second timer R is the one used to verify that the other peer device has sent a verification message and that this message has been received. T and R on one peer device, host or gateway, correspond respectively to R and T on the other one with an additional delay equal to the transmission time if needed.

In case of a T interrupt, a verification message detailed in FIG. 3 is sent on step SEND VERIF 64 each time T raises an interrupt according to the pseudo-random sequence for T values.

For the R timer, an interrupt is generated at a time called R+ corresponding to the time on which the verification message from the other side should have been received. R+ corresponds to R plus a delay that can be adjusted to build a valid reception window for Verification messages. If no message is received when timer R+ expires and raises the interrupt, step 66 sends a CHECK message to the opposite device (H or GW), aborts the connection and log an alert at step 68. The CHECK message indicates that no Verification message has been received in the expected time frame.

Figure 4C:
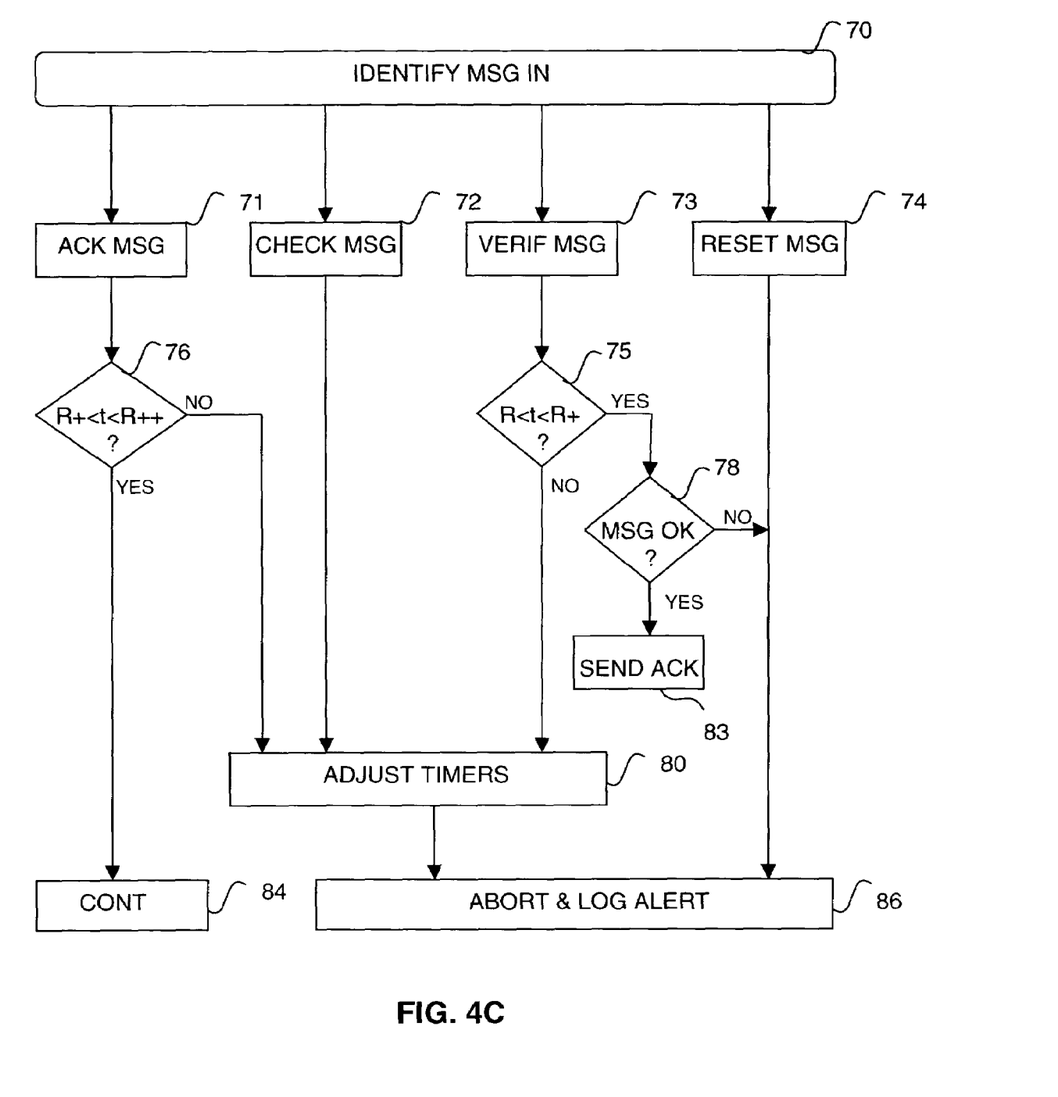
FIG. 4C is a flow chart representing the actions which are initialized upon receiving messages either in the host or in the gateway.

FIG. 4C describes the process when a control message is received on one peer device, host or gateway during an opened secure session. Four types of messages may be received which are identified on step IDENTIFY MSG IN 70.

In case of RESET request message 74 issued after a local spoofing described in FIG. 4A, the session is aborted and the alert information provided within the message is stored for further analysis on step 86. Such a RESET message is also sent when the sequencing on data packets is activated and an error is detected by the receiving peer device on this sequencing. The RESET message therefore contains a field identifying the type of event that raised the transmission of the message.

In case of VERIF message 73, verification that this message is received at a time t within the time slot defined by T and R+ is performed on step 75. Only a verification message received between R and R+ will be considered as valid. The real time value may also be stored to compare the real value against the predefined R+ value. This can be used to adjust this value if necessary according to step 80.

When validated for the timing, an additional verification of the content of the message compared against the received data packets between this VERIF MSG and the previous VERIF MSG is performed at step MSG OK 78. It may include the checking of several elements such as number of packets received, size of packets, and signature of packets.

If the checking is satisfactorily completed, this process sends back to the peer device an acknowledge message SEND ACK 83. Such message as the verification message can use the time window method with timers. If not, the process aborts the connection and logs an alert at step 86.

If the message is a check message 72 sent thanks to step 66 on the opposite device, then the process first adjusts the timer values if possible and in parallel (but shown in sequence on the drawing) aborts the connection and logs an alert on step 86.

The last case is when the message is an ACK message 71. If the device that sent the verification message doesn't receive the acknowledgment at a time t within a defined time frame defined as the time window between R+ and R++ as checked by step 76, the process will first try to adjust at step 80 the value of R++ and in parallel will abort and log an alert on step 86. IF the ACK message is within the defined timeslot, the process continues corresponding to step 84 which can log if needed the real value of the receive time for this message. This may be activated in learning mode to identified appropriate values for timers.

Figure 5:
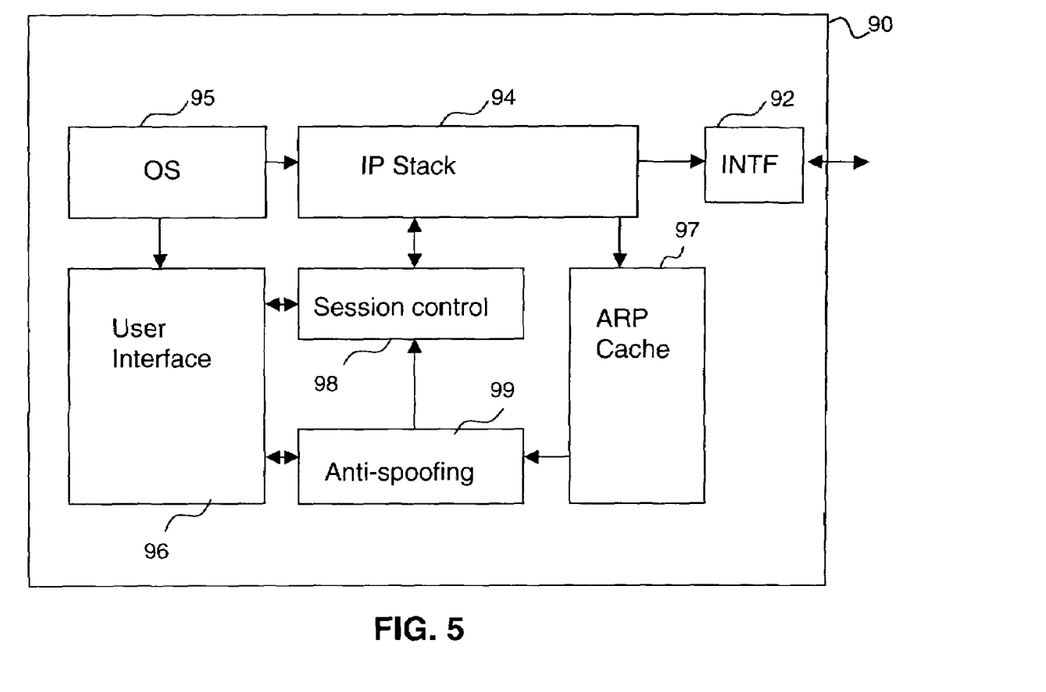
FIG. 5 is a block-diagram of the different functional blocks in either the host or the gateway.

Referring to FIG. 5, the functional embodiment of a peer device, host or gateway, includes the LAN interface INTF 92 generally being Ethernet, the IP STACK 94 which contains the drivers for the LAN interface 92 and supports the low layers of TCP/IP allowing applications running on top of OS 95 to connect to the network, the operating system OS 95 on which run the user applications and the ARP cache 97 which stores the ARP table.

As a new functional block, the session control block 98 has a specific dedicated access to the IP stack to generate control messages within a session and get data packet details such as length, CRC and can look at any byte to rebuild on the fly a packet signature. As described in FIG. 4A, some actions require a manual user action that is performed on User Interface 96.

User Interface 96 also interfaces the anti-spoofing block 99 in order to work on ARP tables stored in ARP cache 97 via control block 99 as described hereunder. Changes on these ARP elements can be done directly from the user interface with assistance from the expert system located on Anti-spoofing 99 that analyzes both the ARP cache and stored current and previous ARP tables.

The anti-spoofing block contains the anti-spoofing measures implemented in the devices which analyze the local network and check for IP and MAC address spoofing. This mechanism works closely with the ARP cache in order to detect changes that can be attacks. In fact any change in the ARP cache related to one device will start the checking process for security event SEC EVENT 41 of FIG. 4A.

The MAC and IP vulnerabilities will be better understood with the description of the way ARP tables and IP/MAC addresses are managed, which explains that any network that uses shared-segment technologies is vulnerable to spoofing specific to these types of networks.

The ARP protocol is a protocol that is used on shared segments in order to 'map' IP addresses to MAC addresses. This protocol is particularly vulnerable due to the fact that it makes use of broadcasts, and has not a single form of authentication in the protocol. Basically, when a system needs to send an IP datagram, it will look to see if the IP address is in its current ARP table. If it is not, it will broadcast an ARP request on the shared segment, and will bind the IP address to the MAC address mentioned in the ARP response it receives on this.

The use of spoofed ARP responses makes it possible for an attacker to disrupt the network, but more than that makes it possible for the attacker to take the place of another device in the LAN for sending and receiving packets or implement a simple "man-in-the middle" attack allowing to intercept all packets from a source and replay (generally modified) the packets.

The use of static ARP tables takes away much of the impact of the shared-segment spoofing, but is less flexible for users. Anyway one important point still remains. Most operating systems do not check if a received IP datagram originates from a MAC address that makes any sense. Therefore, the plug-in fills this gap and provides a permanent ARP cache and table control even if the ARP table is not static. The plug-in anti-spoofing element 99 considers that a part of the ARP cache, including devices always present on the LAN such as routers or gateways, should be considered as static and any event on this part is considered as a potential attack and generates the SEC EVENT 41. Two basic rules are continuously verified: The local running datagram IP source addresses should match the MAC addresses in the ARP table, and non-local IP datagrams should match the MAC address of one of the 'known routers' that has a valid route entry in the routing table such as R1 in the description.

Further, any 'local' new IP address that does have or had in the past an entry in the ARP table for IP and MAC addresses should not be accepted when the session is running. This is also a security event that will start the process from step 41. The storage within Host of previous existing and valid IP/MAC address association will allow supporting new devices if known in the past which means that there is an entry in one of the stored ARP tables even if they are using a different IP address if the IP address still belongs to the DHCP allowed address range.

Each computer running TCP/IP uses a cache that contains mappings between IP addresses and media access control (MAC) or network adapter addresses on the network. The cache is maintained by the address resolution protocol (ARP) and is dynamic. This is why the ANTI-SPOOFING 99 is directly linked to this cache to identify any dynamic change. A change on the ARP cache may either be due to a request coming from the local Host, for example if the Host H is establishing another session with another device in the network, or when the target device's IP address is not in the cache, the calling host broadcasting an ARP frame onto the network. The cache must contain correct mappings for communications to function. Such cache update can be granted as being requested by the local Host.

At system startup, when the IP protocol initializes, The Anti-spoofing will compare its previous ARP table with the current network environment. Host H will send an ARP request containing its own MAC and IP address so that other computers can update their ARP caches. If there is already a computer using the IP address, the "older" computer will respond with an ARP reply containing its MAC and IP address, indicating a conflict.

Major changes or a duplicated address may be found. Duplicate address detection is an important standard feature. When the stack is first initialized or when a new IP address is added, gratuitous ARP requests are broadcast for the IP addresses of the local host for this purpose.

A duplicate address found prior to the connection will start an alert that is locally logged and forwarded to the network administrator for verification. The secure session will not be allowed until the verification is completed. A duplicate address found during the secure connection aborts the connection.

Once an ARP table is validated, it is copied in a file that is compared when the host is reconnected on the network. This file is stored within the file system of OS 95 and recovered by the user interface 96. In fact, a historic list of ARP tables will be kept and used for comparison as the legacy table is rebuilt regularly. It reduces the risk of intrusion for the new unknown devices on the network when the host H is powered off or not connected to the network but offers more flexibility to accept new devices on the LAN.

Figure 6:
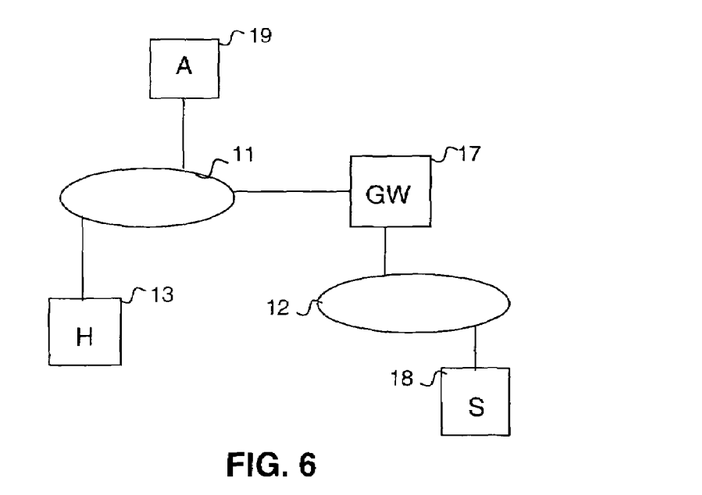
FIG. 6 is a block-diagram representing a general data transmission system wherein the method according to the invention can be implemented.

FIG. 6 shows the environment where a direct LAN connection exists between the two peer devices host 13 and gateway 17 using a secure connection. In that case, Host H and gateway GW are connected to the same LAN 11. Compared to FIG. 1, the connection between H and GW is a LAN connection instead of a multiple network connection mix of LAN and WAN.

On this simplified model, the secure connection can also be established. The local LAN IP/MAC anti-spoofing can be reduced to only one device either the Host or the Gateway. In that case, the plug-in function may only contain the session control.

To conclude, the mechanism proposed is a method for providing secure access, remote or local, proposing some securing flows between a gateway and a host, with optionally, a local anti-spoofing. It may be an improvement for multiple user remote connection using tunnelling technology. It can be part of authentication servers/portals.

A major domain of application is home office when the tunnel is done from a router to the intranet. Anyone on the local LAN can reach the intranet if it has access to this local LAN either because no further authentication is performed on a portal or even if authentication is performed, the spoofing is very easy. It is even more dangerous with wireless LANs.

The invention claimed is:

1. Method of gaining secure access from a host to Intranet resources provided by a content server in a data transmission system wherein the host is connected to the content server through a gateway, wherein said host and gateway are peer devices, the method comprising the steps of:

generating and sending at predetermined transmission intervals from either the host or gateway, verification messages wherein each verification message contains a signature which depends upon the data exchanged between the host and the gateway, preceding said each verification message, the host and gateway utilizing an algorithm which determines whether the host or gateway sends a verification message at each of the predetermined intervals, wherein the predetermined transmission intervals are provided by a timer T in the host and gateway and are defined utilizing a secret key shared by both peer devices.

2. The method according to claim 1, wherein a timer R in the peer devices defines the reception intervals during which the verification message sent by a first peer device is received by the other peer device, the reception intervals for each of the peer devices corresponding to the predetermined transmission intervals for the other peer device with an additional delay equal to the transmission time.

3. The method of claim 2, wherein the verification message sent at a predetermined transmission interval by the first peer device must be received by the other peer device within a first predetermined time slot after the reception interval corresponding to the predetermined transmission interval to be considered as being valid, and further comprising the step of sending an acknowledgement message back from the other peer device to the first peer device when the verification message is received within the first time slot.

4. The method of claim 3, wherein a check message is sent back by the other peer device to the first peer device when the verification message is not received within the first time slot, and further comprising the step of activating abort and log alert procedures in the other peer device.

5. The method of claim 3, wherein the acknowledgment message must be received by the first peer device within a second predetermined time slot after the end of the first time slot to be considered as being valid, and further comprising the step of activating abort and log alert procedures in the first peer device.

6. The method of claim 5, wherein a reset message is transmitted by the first peer device to the other peer device upon detection of a secure event, the reset message initializing a procedure of aborting the connection and logging an alert when received by the other peer device.

7. The method of claim 6, wherein the connection between the peer devices is re-started if a secure event is validated and wherein the connection is not re-started and an alert is logged if a secure event is not validated.

8. The method according to claim 7, wherein the validation of the secure event is either a local validation after displaying a POP UP window on the user screen of the host or an administrative validation after forwarding a request to a network administrator.

9. The method of claim 7, wherein the validation of the secure event includes a change of IP or MAC address of the gateway.

10. The method of claim 9, further comprising the step of activating a secure event when an IP source address of a data packet does not match the corresponding MAC address in a mapping table.

11. The method of claim 10, wherein each of peer devices generates the same pseudo-random sequence to exchange IP data packets and wherein the value of the sequence number is determined by a predetermined algorithm.

12. The method according to claim 11, wherein the pseudo-random sequence number is created using an original packet sequence number and a signature or secret key is used by the peer devices to recreate the original packet sequence number.

* * * * *